US011265724B2

(12) United States Patent
Manithara Vamanan et al.

(10) Patent No.: US 11,265,724 B2
(45) Date of Patent: Mar. 1, 2022

(54) METHOD AND ARRANGEMENT FOR ALLOCATING RADIO RESOURCES

(71) Applicant: Intel Corporation, Santa Clara, CA (US)

(72) Inventors: Sudeep Manithara Vamanan, Nuremberg (DE); Ana Lucia Pinheiro, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/642,962

(22) PCT Filed: Jul. 31, 2018

(86) PCT No.: PCT/US2018/044460
§ 371 (c)(1),
(2) Date: Feb. 28, 2020

(87) PCT Pub. No.: WO2019/067082
PCT Pub. Date: Apr. 4, 2019

(65) Prior Publication Data

US 2020/0267558 A1 Aug. 20, 2020

(30) Foreign Application Priority Data

Sep. 29, 2017 (EP) .................................... 17194078

(51) Int. Cl.
*H04W 16/10* (2009.01)
*H04W 24/02* (2009.01)
*H04W 72/04* (2009.01)

(52) U.S. Cl.
CPC ........... *H04W 16/10* (2013.01); *H04W 24/02* (2013.01); *H04W 72/048* (2013.01); *H04W 72/0453* (2013.01)

(58) Field of Classification Search
None
See application file for complete search history.

(56) References Cited

U.S. PATENT DOCUMENTS

2013/0285855 A1 10/2013 Dupray et al.
2017/0188355 A1* 6/2017 Ma ........................ H04W 76/14
(Continued)

FOREIGN PATENT DOCUMENTS

KR 20130041659 A 4/2013
WO 2017001223 A1 1/2017

OTHER PUBLICATIONS

Article 94(3) Communication for EPO Application No. EP 17 194 078.6 and Human Translation of D4 (KR 10-2013-0041659 A); dated Dec. 1, 2020; 10 pages.
(Continued)

*Primary Examiner* — Saba Tsegaye
(74) *Attorney, Agent, or Firm* — Viering, Jentschura & Partner mbB

(57) ABSTRACT

Computer-readable media, methods and apparatus for allocating radio resources for a geographic region are disclosed. In some aspects, the apparatus may be an arrangement including a determiner that determines first radio resource utilization information for a first duration of a first geographic region. The arrangement may also include an estimator that estimates second radio resource utilization information for a second duration of a second geographic region, based on the first radio resource utilization information and based on movement information about a plurality of communication terminals that affected the first radio resource utilization information in the first geographic region. The arrangement may further include an allocator that allocates radio resources for the second geographic region based on the estimation of the second radio resource utilization infor-
(Continued)

600

601
Determine first radio resource requirements which exist in a first geographic region in a first time period 602
Estimate second radio resource requirements which exist in a second geographic region neighboring the first geographic region in a second time period following the first time period based on the first radio resource requirements and based on movement information about communication terminals causing the first radio resource requirements in the first geographic region 603
Allocate radio resources to the second geographic region based on the estimation of the second radio resource requirements mation. The first duration may precede the second duration, and the first geographic region may neighbor the second geographic region.

20 Claims, 7 Drawing Sheets

(56) References Cited

U.S. PATENT DOCUMENTS

| | | | | |
|---|---|---|---|---|
| 2017/0188391 | A1 | 6/2017 | Rajagopal et al. | |
| 2017/0245245 | A1 | 8/2017 | Kim et al. | |
| 2018/0063825 | A1* | 3/2018 | Van Phan | H04W 92/18 |
| 2018/0242190 | A1* | 8/2018 | Khoryaev | H04L 47/283 |
| 2018/0376485 | A1* | 12/2018 | Kahtava | H04W 4/44 |

OTHER PUBLICATIONS

International Search Report and Written Opinion for International Application No. PCT/US2018/044460, dated Nov. 6, 2018, 11 pages (for reference purposes only).

Extended European Search Report (eESR) for EPO Application No. EP 17 194 078.6; dated Apr. 4, 2018; 6 pages (for reference purposes only).

Article 94(3) Communication for EPO Application No. EP 17 194 078.6; dated Jun. 19, 2020; 9 pages (for reference purposes only).

International Search Report issued for the international counterpart application No. PCT/US2018/044460, dated Nov. 6, 2018, 11 pages (for reference purpose only).

* cited by examiner

For eg., N Physical Resource Blocks every 200 ms
200
T= 0 to T=5
V2X carrier
Frequency
208
205
time
Zone A
Zone B
Zone C
Highway
201
202
203
204
150 m
T= 5 to T=10
V2X carrier
Frequency
209
206
time
Zone A
Zone B
Zone C
202
201
203
204
150 m
T= 10 to T=15
V2X carrier
Frequency
210
207
time
Zone A
Zone B
Zone C
Highway
202
203
201
204
150 m 300
For eg., N Physical Resource Blocks every 200 ms
T= 0 to T=5
315
313
304
V2X carrier
Frequency
1
2
3
time
310
Zone A
Zone B
Zone C
Highway
301
307
302
308
303
309
150 m
T= 5 to T=10
316
314
311
305
Zone A
Zone B
Zone C
T= 10 to T=15
317
312
306
Resource for PLMN X
Resource for PLMN Y 400
For eg., N Physical Resource Blocks every 200 ms
T= 0 to T=5
412
416
410
414
404
V2X carrier
Frequency
1
2
3
4
time
Zone A
Zone B
Zone C
Highway
401
407
402
408
403
409
150 m
418
T= 5 to T=10
415
413
417
405
411
V2X carrier
Frequency
1
2
3
4
time
Zone A
Zone B
Zone C
407
401
408
402
418
403
409
150 m
Resource for PLMN X
Resource for PLMN Y

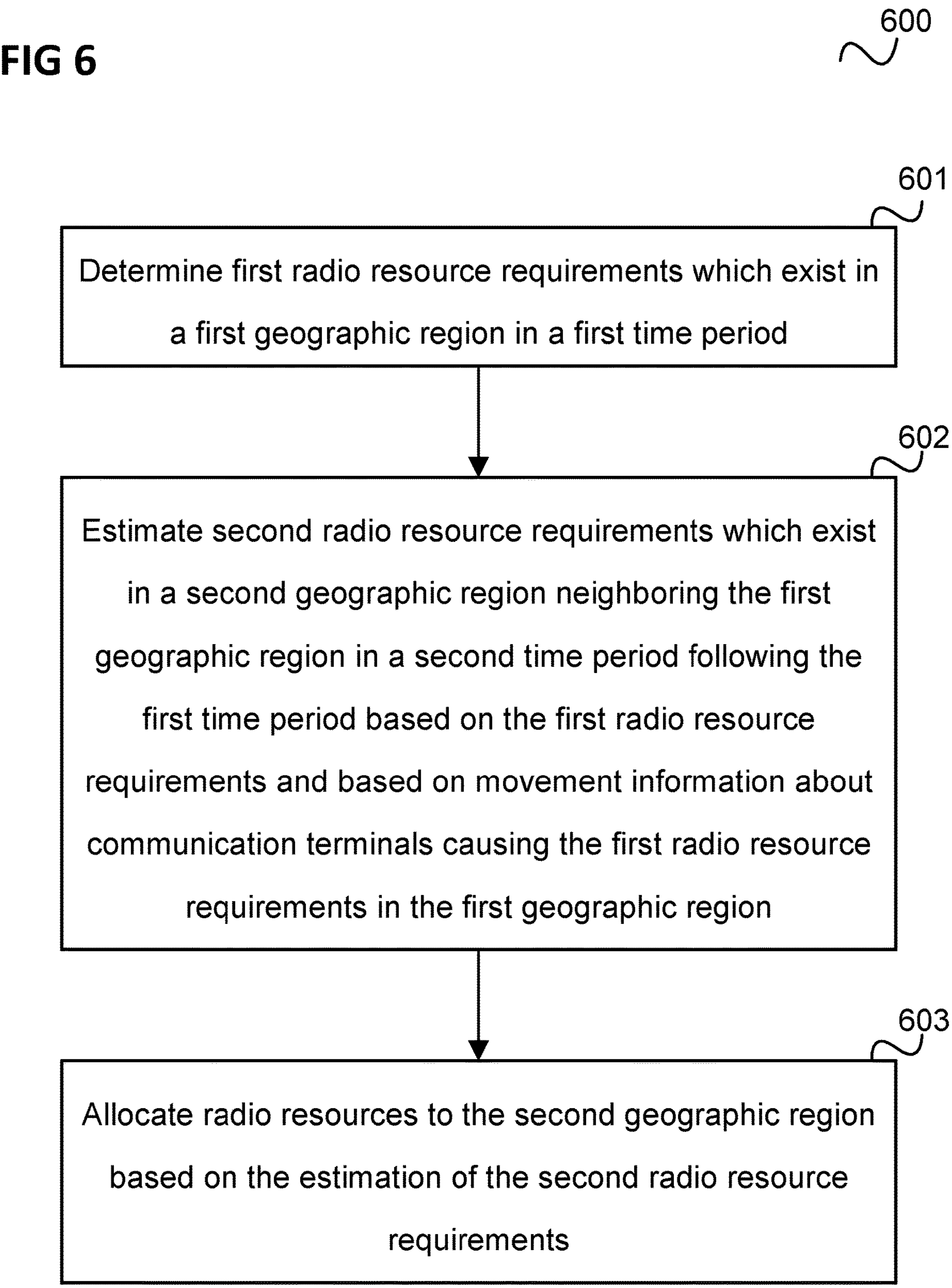
FIG 6
600
601
Determine first radio resource requirements which exist in a first geographic region in a first time period
602
Estimate second radio resource requirements which exist in a second geographic region neighboring the first geographic region in a second time period following the first time period based on the first radio resource requirements and based on movement information about communication terminals causing the first radio resource requirements in the first geographic region
603
Allocate radio resources to the second geographic region based on the estimation of the second radio resource requirements

METHOD AND ARRANGEMENT FOR ALLOCATING RADIO RESOURCES

CROSS-REFERENCE TO RELATED APPLICATIONS

This patent application is a national stage entry of International Patent Application No. PCT/US2018/044460 under 35 U.S.C. §§ 365 and 371, filed on Jul. 31, 2018, which claims priority to European Patent Application No. 17194078.6, filed on Sep. 29, 2017. The disclosures of the foregoing documents are incorporated herein by reference in their entirety and for all purposes.

FIELD

Exemplary implementations described herein generally relate to methods and arrangements for allocating radio resources.

BACKGROUND

Communication services like V2X (Vehicle-to-Everything) may be based on shared radio communication resources such as a shared frequency band, i.e. communication resources which may be used by different base stations, possibly belonging to different cellular mobile communication networks, e.g. mobile communication networks of different operators. Since radio communication are limited, approaches are desirable which allow allocation of radio resources that is efficient, e.g. in terms of the quality of the communication services provided based on the radio resources.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. In the following description, various aspects are described with reference to the following drawings, in which:

FIG. 6 shows a flow diagram illustrating a method for allocating radio resources to a geographical region.

DETAILED DESCRIPTION

The following detailed description refers to the accompanying drawings that show, by way of illustration, specific details and aspects of the present disclosure. Other aspects may be utilized and structural, logical, and electrical changes may be made without departing from the scope of the present disclosure. The various aspects of the present disclosure are not necessarily mutually exclusive, as some aspects of the present disclosure can be combined with one or more other aspects of the present disclosure to form new aspects.

Figure 1:
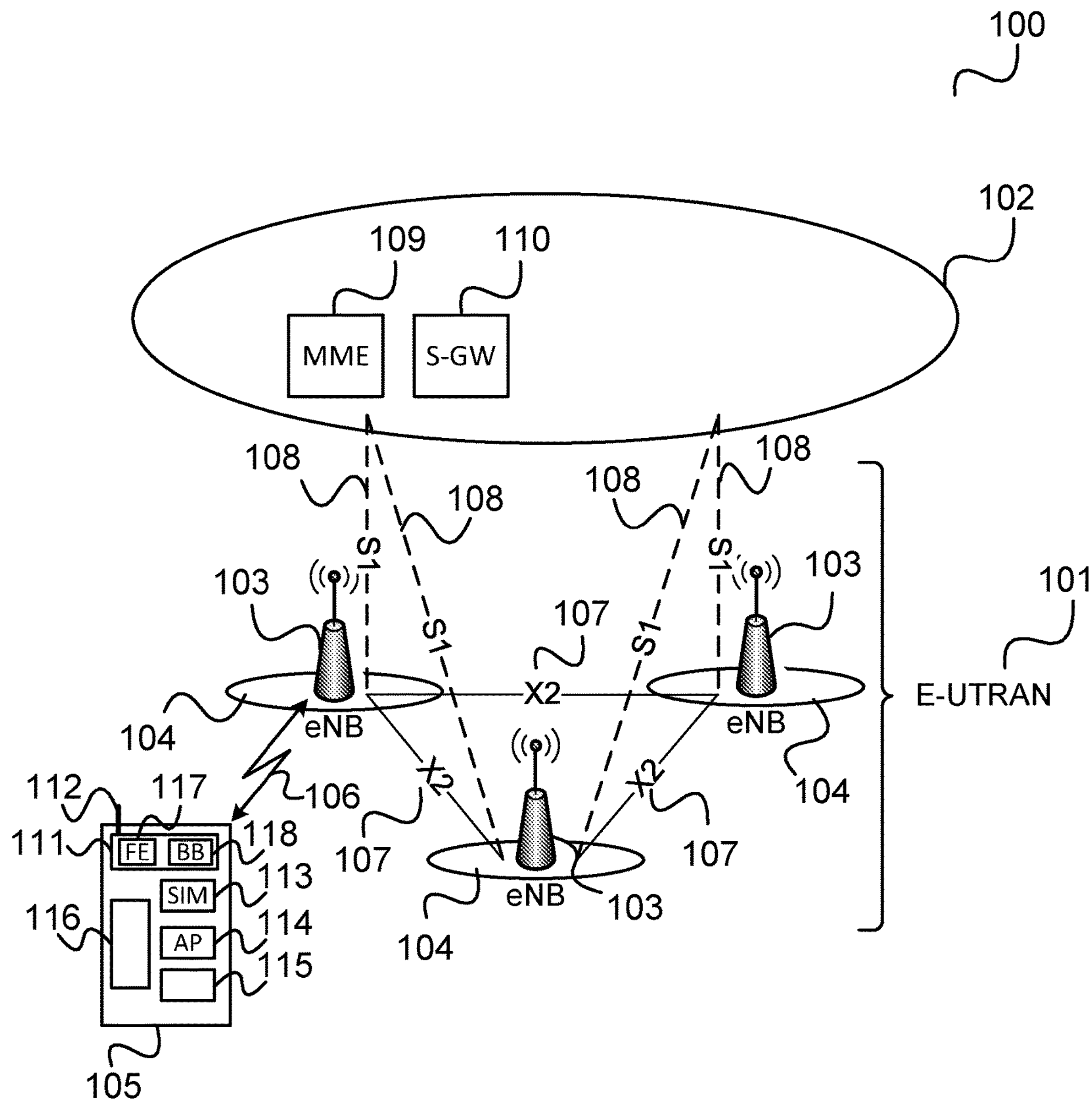
FIG. 1 shows a communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell. In certain scenarios, for example in case of Vehicle-to-Anything (V2X) communication, the mobile terminal (UE) 105 may also directly communicate with another mobile terminal, possibly attached to a different PLMN, i.e. while bypassing the base stations 103. This direct communication may take place over a common radio resource (spectrum, frequency, time unit) equally accessible to both network operators. According to various examples as described below, the arbitration of this radio resource is addressed. In a given time window each unit of this radio resource could be claimed by any of the participating PLMNs and allocated to UEs attached to it.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network 102 may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) or 5G (Fifth Generation) radio access. Accordingly, the radio access network 102 may operate as an E-UTRAN, a UTRAN, a GSM radio access network, a GERAN (GSM EDGE Radio Access Network) or a 5G radio access network. Analogously, the core network 102 may include the functionality of an EPC, a UMTS core network, a GSM core network or a 5G core network.

For radio communication via the air interface 106, the mobile terminal 105 includes a communication subsystem 111 and one or more antennas 112 and one or more multiple subscriber identity modules 113. The mobile terminal 105 also includes an application processor 114 as well as a main memory 115 for running applications. The mobile terminal 105 further includes a battery 116 for power supply. The mobile terminal 105 may include further components such as a display, a speaker, a microphone etc. The communication subsystem 111 may include a radio frequency transceiver (e.g. including a radio frontend) 117 and a baseband processor 118.

LTE uses Orthogonal Frequency Division Multiplexing (OFDM) for the downlink (i.e. for the transmission from the base station to the terminal). By this technique, data are transmitted over many narrow band carriers of 180 KHz each, i.e. OFDM uses a large number of narrow sub-carriers for multi-carrier transmission to carry data. OFDM is a frequency-division multiplexing (FDM) scheme used as a digital multi-carrier modulation method. It meets the LTE requirement for spectrum flexibility and enables cost-efficient solutions for very wide carriers with high peak rates. The basic LTE downlink physical resource can be seen as a time-frequency grid. OFDM symbols are grouped into resource blocks. The resource blocks have a total size of 180 kHz in the frequency domain and 0.5 ms in the time domain. Each 1 ms Transmission Time Interval (TTI) consists of two slots.

Each mobile terminal 105 is allocated a number of so-called resource blocks in the time frequency grid. The more resource blocks a mobile terminal 105 gets, and the higher the modulation used in the resource elements, the higher the bit-rate is that it achieves in the communication. Which resource blocks and how many the mobile terminal 105 is allocated at a given point in time depends on the scheduling mechanism.

For the uplink, according to LTE, SC-FDMA is typically be used which can be regarded as OFDM with a DFT (Discrete Fourier Transform)-based precoder. The resource (time-frequency) grid for the uplink is therefore similar to the one for the downlink described above.

The mobile terminal 105 may, for example, be a portable phone and may include typical communication terminal components, such as a transceiver, an antenna, a subscriber identity module, an application processor, a memory, a display, a battery, a speaker, a microphone, etc.

According to various embodiments, however, the mobile terminal 105 is a vehicle UE, i.e. a mobile terminal (or user equipment according to LTE) that is part of a vehicle. This means that the vehicle has its own subscription (and e.g. its own SIM 113). Such a scenario is the basis of Vehicle-to-everything (V2X) communication which involves the passing of information from a vehicle to any entity that may affect the vehicle (e.g. another vehicle), and vice versa.

3GPP has introduced LTE based V2X services in Release 14. Direct UE to UE communication V2X services are currently defined on dedicated ITS band (5.9 GHz). The typical deployment would be a 10 or 20 MHz carrier on this frequency band designated as Band 47 (B47). The UEs (vehicles or RSUs (road side units)) are configured to use radio interface resources (physical resource blocks per subframe) in this carrier for communication using LTE sidelink channel communication (also referred to as PC5 interface, which is the interface used for device-to-device direct communication). Two types of resource usage are standardized. In one (autonomous mode or mode 4), the UEs select resources autonomously. In the second method (eNodeB controlled mode or mode 3), the resources are assigned by the eNBs (LTE Radio Access Nodes) that the UE is currently communicating with.

In any given region, there may be more than one base station (eNB) deployed, likely in this case deployed by different operators. According to the above, the eNBs from different operators use the same frequency band for V2X services and thus they need to share radio resources. The eNB controlled mode (mode 3) brings interesting challenges in terms of (radio) resource sharing as the UEs attached to different PLMNs share the 10 or 20 MHz carrier in Band 47. Hence special techniques are desired for eNBs to assign resources in this shared carrier.

A straightforward approach for resource sharing (here sharing the V2X carrier in B47 PLMNs among multiple PLMNs) is to agree on a static resource sharing configuration, each eNB having its own allocated resource pool. Then each eNB performs resource assignment within its allocated resource pool. However this method suffers from the drawback of inefficiency. The distribution of vehicles belonging to each PLMN may vary and a fixed allocation may cause congestion on a given PLMN's resource pools whereas another PLMN's resource pool may have excess resources.

In the following, efficient approaches are described for distributing resources for V2X sidelink communication across eNodeBs (and possibly across PLMNs) sharing the same V2X carrier.

According to various approaches, a mechanism is provided which includes estimation of resource requirement for a given zone from the measurement of resource usage in a geographically preceding zone (in the direction of traffic) and chronologically preceding time window.

Figure 2:
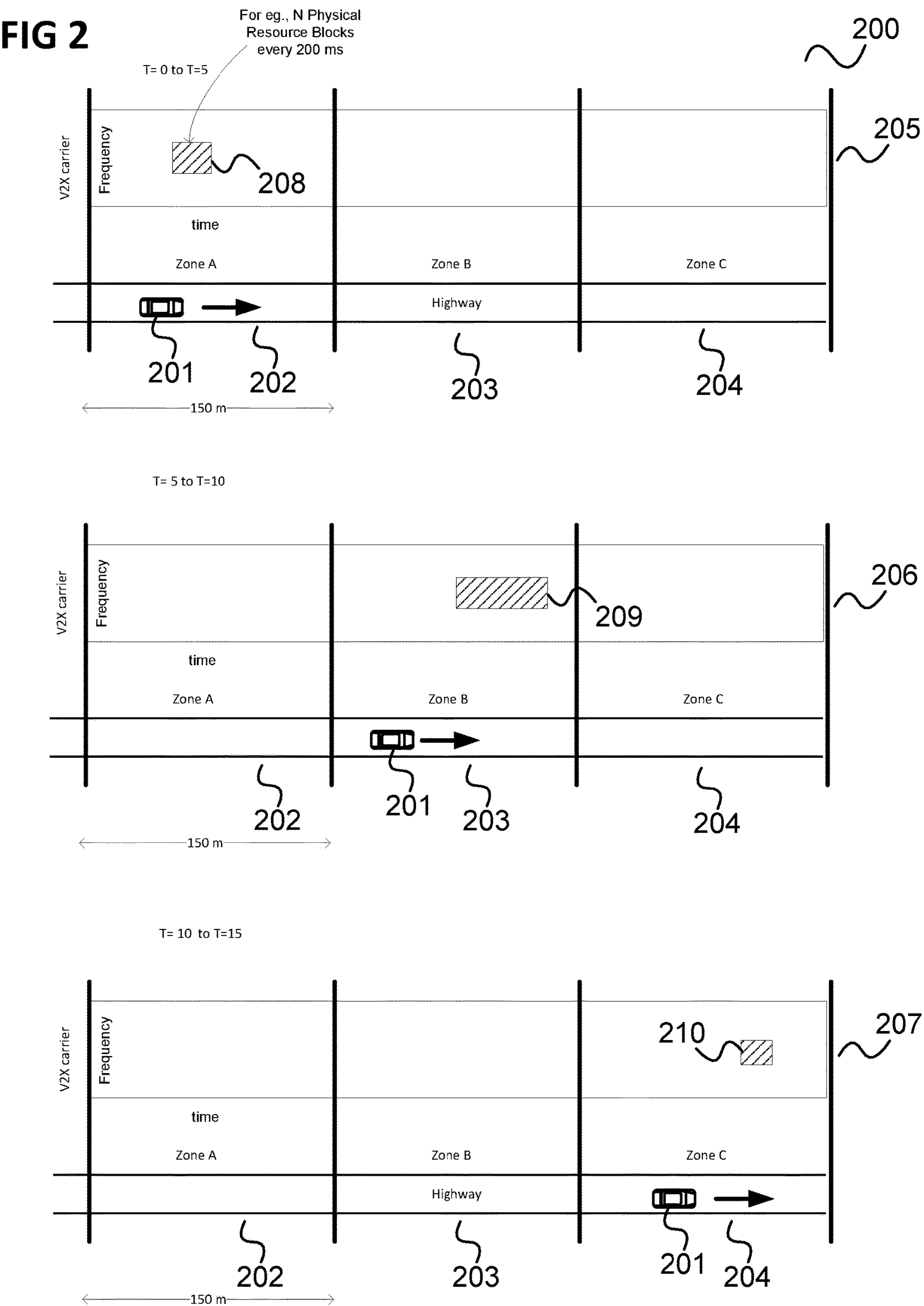
FIG. 2 shows an example of radio resource usage by a vehicle along a section of a highway at different time periods as the vehicle is driving through different segments of the highway.

FIG. 2 shows an example of radio resource usage by a vehicle (including an UE) 201 along a section of a highway at different time periods as the vehicle is driving through different segments of the highway, each section corresponding to a zone 202, 203, 204.

A first diagram 205 shows the state during a first time period [T=0 to T=5], a second diagram 206 shows the state in a second time period [T=5 to T=10] and a third diagram 207 shows the state in a third time period [T=10 to T=15].

The three zones have each a length of 150 m. At a speed of 100 kmph, a car takes about 5 seconds to traverse each zone. The V2X resource allocation can make use of the concept of resource assignment per zones (which is a smaller unit of a radio cell, i.e. a zone (e.g. according to the V2X specification) can be seen as a sub-cell).

As illustrated by the first diagram 205, in the first time period [T=0, t=5], the vehicle (e.g. car) is in the first zone 202 (zone A). As illustrated by the second diagram 206, the car moves into the second zone 203 (zone B) in the second time period [t=5, t=10] and, as illustrated by the third diagram 207, into the third zone 204 (zone C) in the third time period [t=10, T=15]. The resource usage in each zone 202, 203, 204 in the three time periods is also shown as a respective hatched block 208, 209, 210. The resource usage is, for example, a number of resource blocks at a fixed periodicity of sub-frames. In a highway section where no additional traffic exits or enters, a base station serving a zone 202, 203, 204 can estimate its resource requirement for the car 201 based on the resource usage in the previous time window in the zone 202, 203, 204 preceding the zone served by the base station. The base station may, for example, receive information about the resource usage in the preceding zone from a base station serving the preceding zone. The base station may perform the action of estimating required resources, for example every 100 ms (similar to resource reselection period defined for mode 4), because the time at which zone change happens is typically different for different cars.

Figure 3:
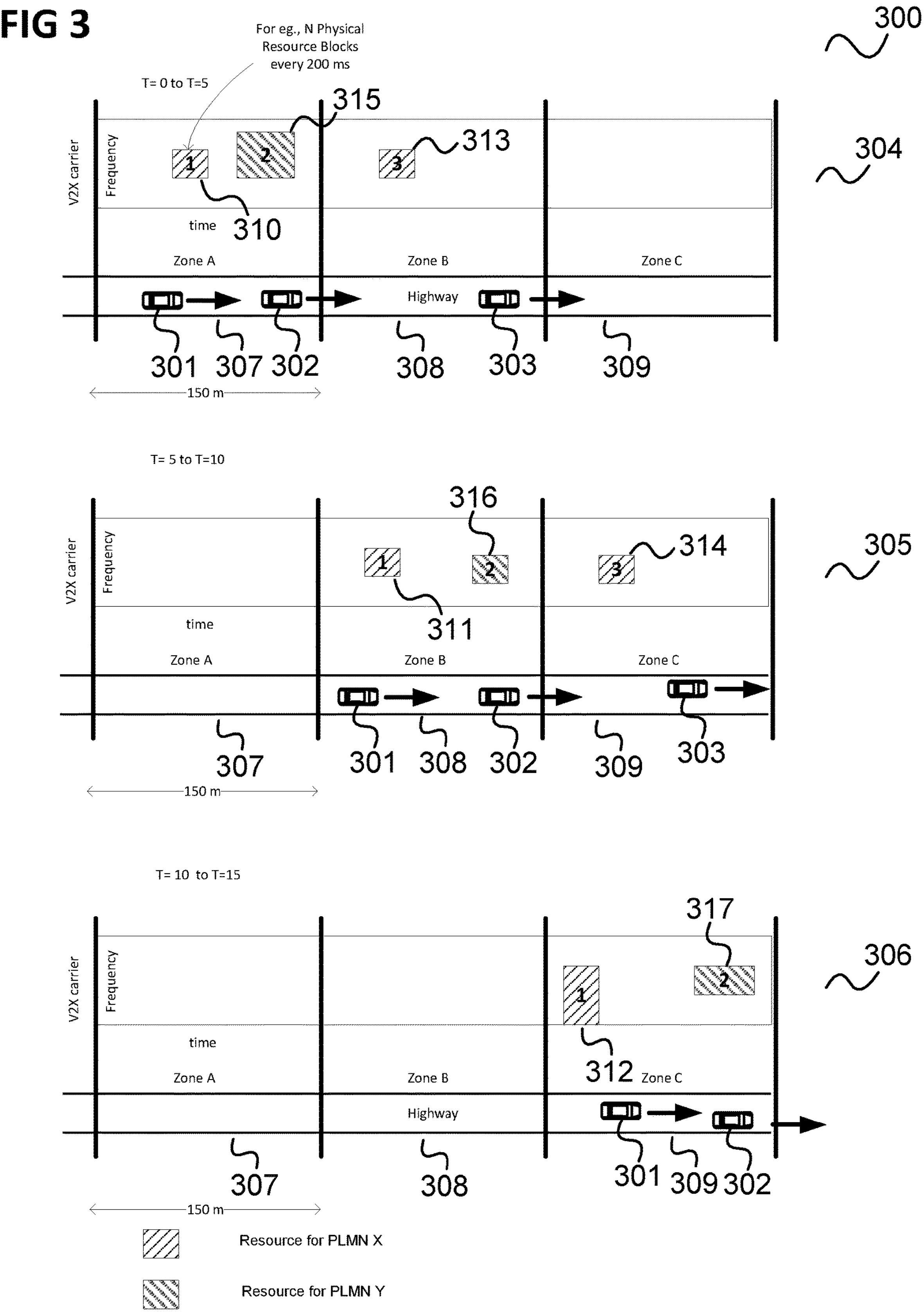
FIG. 3 shows an extension of the scenario of FIG. 2 with multiple cars belonging to two different PLMNs (Public Land Mobile Networks).

FIG. 3 shows an extension of the scenario of FIG. 2 with multiple cars 301, 302, 303 belonging to two different PLMNs.

As in FIG. 2, a first diagram 304 shows the state during a first time period [T=0 to T=5], a second diagram 305 shows the state in a second time period [T=5 to T=10] and a third diagram 306 shows the state in a third time period [T=10 to T=15].

Each diagram 304, 305, 306 shows the resource utilization for three zones 307, 308, 309 (referred to as zones A, B and C) by means of first hatched blocks 310, 311, 312, 313, 314 for a first PLMN and second hatched blocks 315, 316, 317 for a second PLMN. The first car 301 and the third car 303 belong to the first PLMN (PLMN X) and the second car 2 belongs to the second PLMN (PLMN Y).

As can be seen in the FIG. 3, PLMN X and Y have varying resource requirements in the zones in the different time periods.

PLMN X has to serve the first car 301 in the zone A and the third car 303 in zone B in the first time period. In the second time period, this gives rise to corresponding resource requirements in zone B and zone C. In the third time period, PLMN X has resource requirements only in zone C.

Similarly for PLMN Y, the resource requirement moves from zone A to zone B and to zone C in course of the three time periods and base stations (or another network component) of the PLMNs may estimate resource requirements accordingly.

According to various examples, a component of a PLMN can estimate a resource requirement, e.g. of a V2X carrier, for a given zone and given time period based on the observed resource usage in a geographically preceding (in the direction of traffic) zone and chronologically preceding time period.

It should be noted that for simplification, in this example, the traffic only flows in one direction, i.e. each car moves in the same direction, namely from left to right. However, it may also be possible that a certain percentage of the traffic moves in the opposite direction. A component estimating radio resource requirements (e.g. a base station) may take this into account, e.g. may consider the percentage of resource requirements which moves into a certain zone or by taking into account for each car individually where it moves—and its resource requirement with it.

Figure 4:
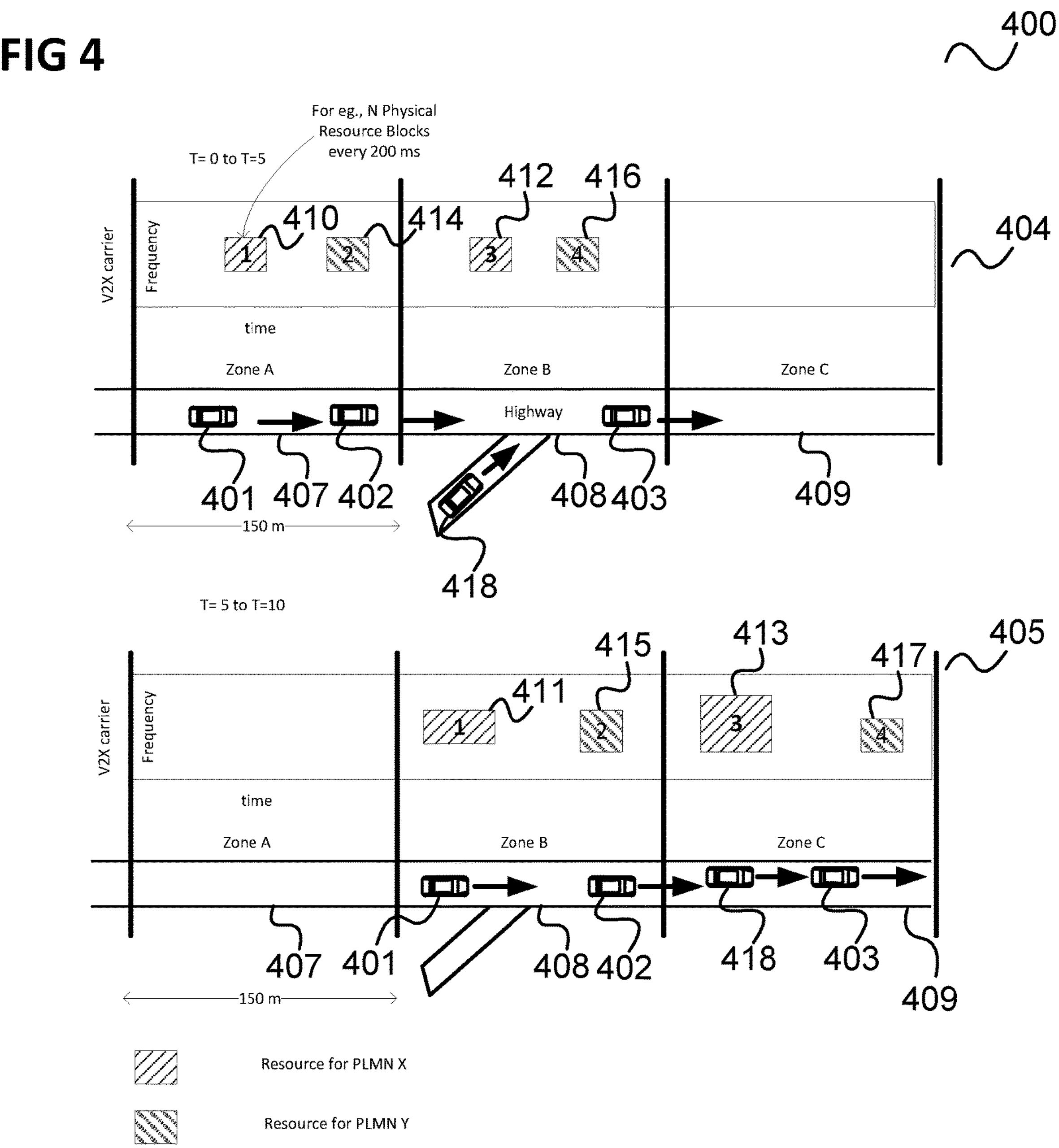
FIG. 4 shows an example of radio resource requirement estimation in a case where traffic joins the highway through an entry-ramp.

FIG. 4 shows an example of radio resource requirement estimation in a case where traffic joins the highway through an entry-ramp.

As in FIG. 3 there are multiple cars 401, 402, 403 on the highway belonging to two different PLMNs. Further, as in FIG. 3, a first diagram 404 shows the state during a first time period [T=0 to T=5] and a second diagram 405 shows the state in a second time period [T=5 to T=10] and each diagram 404, 405 shows the resource utilization for three zones 407, 408, 409 (referred to as zones A, B and C) by means of first hatched blocks 410, 411, 412, 413 for a first PLMN and second hatched blocks 414, 415, 416, 417 for a second PLMN. The first car 401 and the third car 403 belong to the first PLMN (PLMN X) and the second car 2 belongs to the second PLMN (PLMN Y).

Further, in the second time period [T=0, T=5], PLMN Y has an additional new subscriber joining the highway traffic in the form of a fourth car 418. The corresponding resource requirement in the third zone 409 in the second time period could not have been predicted just by observing the resource requirement in the first zone 408 in the first time period. Similarly, a car leaving the highway at an exit does not contribute to the resource requirement in a later traffic zone for that PLMN.

According to various embodiments, for each entry and exit points in the highway a component (e.g. a base station), estimating a resource requirement for a zone and for a PLMN additionally considers entering and leaving traffic respectively. If the component has information about all the cars in the neighboring zones, it can predict the resource usage based on the usage of resources in the surrounding areas.

The information about speed and direction of travel of each vehicle containing a UE subscribed to that PLMN can be determined via the UE of that vehicle sending a control message providing such information, or adding such information in the header of data being sent.

It should be noted that the radio resources needed by each UE are estimated for the next time period based on the resource utilization in the current time period. However, the resource usage requirements may change between time periods, e.g. because a UE may stop transmitting. A predictive approach can also be used, where depending on the size of the basic safety messages (BSM) and typical number of BSM retransmissions (usually 10 times per second is the transmission rate) radio resource requirements are estimated.

Other information that may be used to estimate radio resource requirements is a subscriber's (UE's) request to a navigation application server for a routing, information from traffic management entities on possible road congestion and re-routing, periodic location reporting from the UE or any other traffic and routing related information.

Optionally, a component performing radio resources requirement estimation can use a predicted rate of joining and rate of leaving depending on the area (close to city center, airport), time of the day, and other positioning information that the component might have about one or more UEs.

Accordingly, according to various embodiments, a component (e.g. of a PLMN) may predict radio resource usage (i.e. requirements) in a zone that has traffic entering or exiting the highway based on information other than resource usage in the preceding zone.

Based on above, each PLMN may estimate the amount of radio resources needed in a following time period based on the current resource utilization in each geographical zone. However, as multiple PLMNs may be sharing the total radio resources (e.g. a V2X carrier) in a given geographical area the resource allocations among the PLMNs may also be coordinated.

Figure 5:
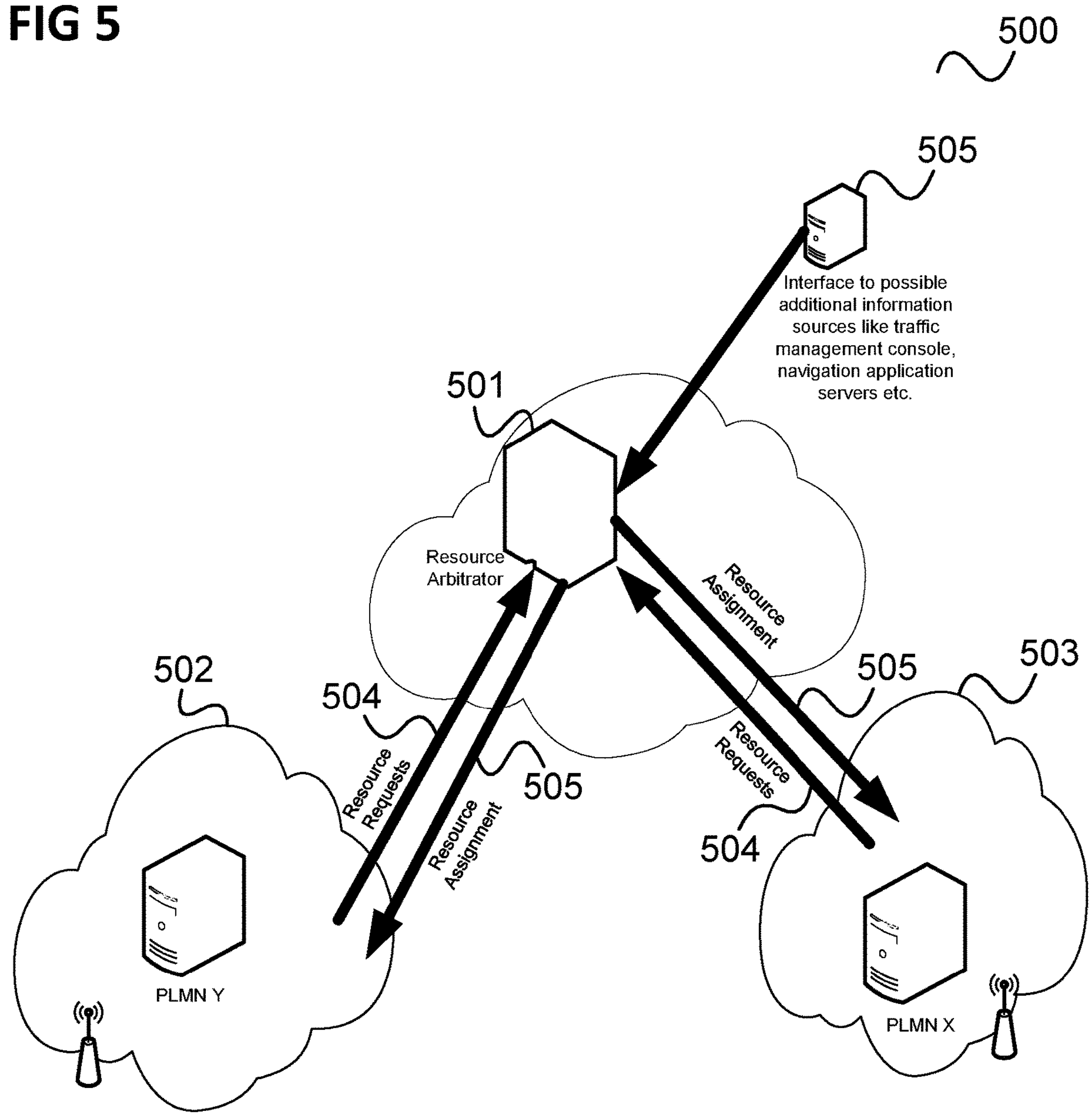
FIG. 5 shows a communication system architecture including a resource arbitrator which is responsible for handling the allocation of radio resources among different PLMNs in the same geographic region.

FIG. 5 shows a communication system architecture including a resource arbitrator 501 which is responsible for handling the allocation of radio resources among different PLMNs 502, 503 in the same geographic region. The resource arbitrator 501 may perform resource usage monitoring, resource usage estimation (prediction) and resource allocation for all PLMNs 502, 503. Optionally, the resource arbitrator 501 may perform resource allocation based on dynamic resource requests 504 from different PLMNs 502, 503 for resource allocation using resource assignment messages 505. A hybrid approach may include the assignment of a minimum set of resources to each PLMN 502, 503 and if more resources are needed by a given PLMN 502, 503, the PLMN sends a request 504 for more resources to the resource arbitrator 501.

According to another example, each PLMN 502, 503 may have a dedicated function (provided by a component of the PLMN) performing resource usage monitoring and resource usage estimation (prediction). The PLMNs 502, 503 may also estimate resource usage based on one or more other sources of data like a navigation server information about subscriber's requests for a routing or a traffic management entity informing about possible congestions and re-routing.

An interface to such a source of data 505 may, as illustrated in FIG. 5, also be directly provided to the resource arbitrator 501.

The resource arbitrator 501 may provide resource information to the participating PLMNs 502, 503 in the form of a pool of PRBs per sub-frame in a time window, e.g. based on UTC (Coordinated Universal Time). Base stations of the PLMNs 502, 503 may use this resource assignment as allocated resource pools to configure UEs in the mode 3 of resource allocation (eNB controlled) in V2X communication.

In the example of FIG. 5, the resource arbitrator 501 is situated externally to the participating PLMN's cellular networks and provides interfaces for resource requests and resource assignments. The resource arbitrator 501 has interfaces to the other sources of data 505 like application servers running navigation apps, traffic management entities etc. These may also be individually connected to the PLMNs 501, 502.

In summary, according to various examples, a method is provided as illustrated in FIG. 6.

FIG. 6 shows a flow diagram 600 illustrating a method for allocating radio resources to a geographical region, for example performed by a resource allocation arrangement.

In 601, the resource allocation arrangement determines first radio resource requirements which exist in a first geographic region in a first time period.

In 602, the resource allocation arrangement estimates second radio resource requirements which exist in a second geographic region neighboring the first geographic region in a second time period following the first time period based on the first radio resource requirements and based on movement information about communication terminals causing the first radio resource requirements in the first geographic region.

In 603, the resource allocation arrangement allocates radio resources to the second geographic region based on the estimation of the second radio resource requirements.

According to various examples, in other words, radio resource allocation to a geographical region, e.g. to a zone (such as a zone in the sense of V2X), is performed based on an estimation of required radio resources, wherein the estimation is based on required radio resources (i.e. radio resource requirements) in one or more neighboring geographical regions and information about which radio resource requirements move to the geographical region for which radio resources are to be allocated. The radio resource requirements can be seen to move with the communication devices that require the radio resources. Thus, information about the movement (e.g. including direction and speed or also probability of a certain movement, e.g. transition into another geographical region) allows determining an estimate of a future radio resource requirement. This may be seen as an extrapolation of a current radio resource requirement into the future.

The estimation of the second radio resource requirements may be performed for each of a plurality of cellular communication networks (e.g. PLMNs) in the way described with reference to FIG. 8 and the allocation of the radio resources may be performed based on the estimations. In other words, radio resources may be distributed to the cellular communication networks based on their estimated radio resource requirements.

The allocation of communication resources to a geographic region may be understood as the allocation of communication resources to one or more base stations serving the communication terminals in the geographic region. The base stations may belong to different cellular communication networks. The base stations may in turn allocate the communication resources to the communication terminals for uplink or downlink transmission or both.

Radio resource requirements existing in a region in a time period may be understood as that there are communication terminals in the region which are to be served during the time period and which, for being served, require certain radio resources, e.g. for uplink communication, downlink communication or possibly also direct communication among themselves. This means that there are one or more communication terminals for which communication resources need to be allocated to allow them to use a communication service. These one or more communication terminals may thus be seen to cause the radio resource requirements in the region and in (i.e. during) the time period.

Figure 7:
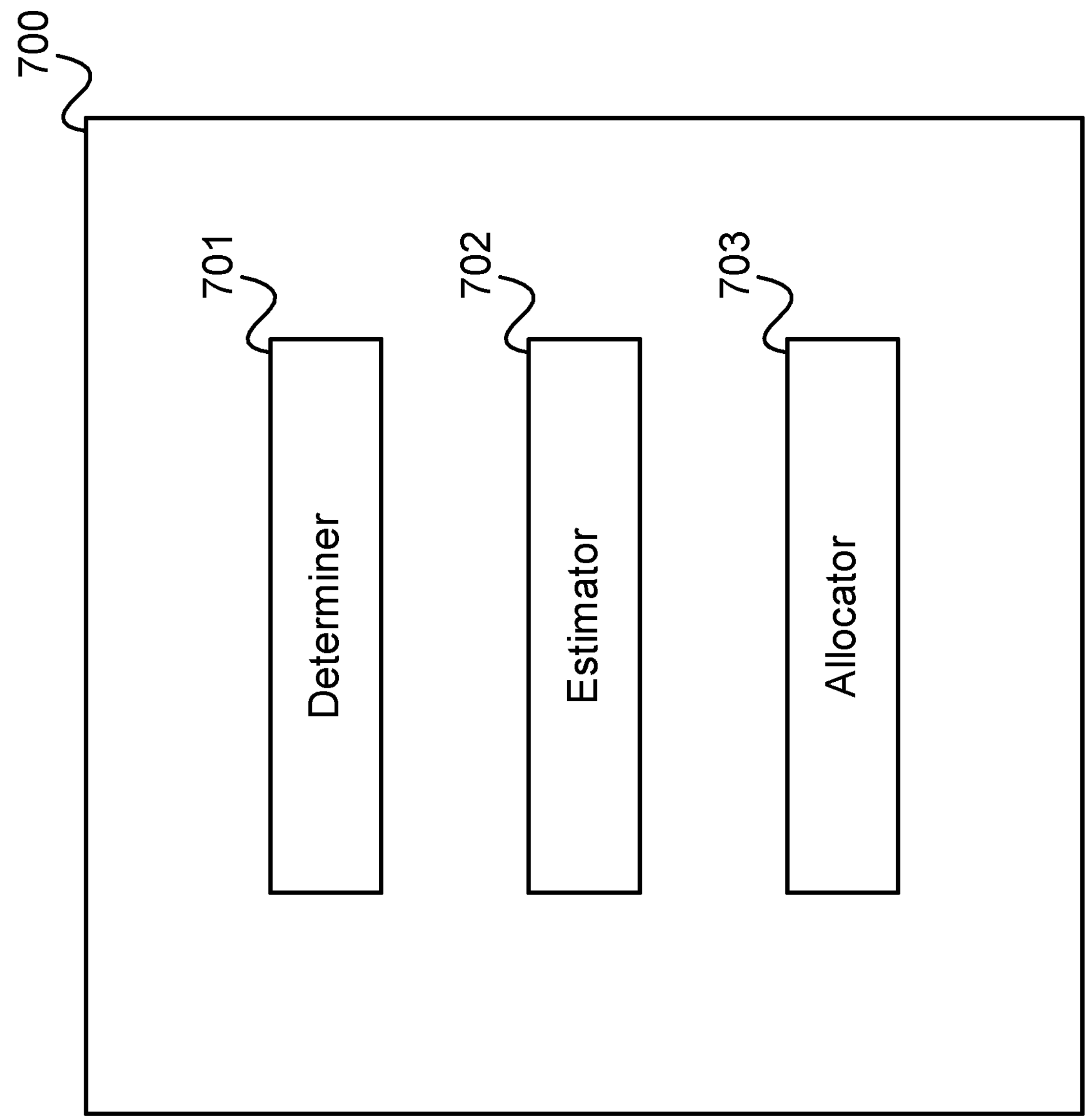
FIG. 7 shows an arrangement for radio resource allocation.

The method illustrated in FIG. 6 may, for example, be performed by a radio resource allocation arrangement, which may consist of one or more communication system components, as illustrated in FIG. 7.

FIG. 7 shows an arrangement 700 for radio resource allocation.

The arrangement 700 includes a determiner 701 configured to determine first radio resource requirements which exist in a first geographic region in a first time period.

Further, the arrangement 700 includes an estimator 702 configured to estimate second radio resource requirements which exist in a second geographic region neighboring the first geographic region in a second time period following the first time period based on the first radio resource requirements and based on movement information about communication terminals causing the first radio resource requirements in the first geographic region.

The arrangement 700 further includes an allocator 703 configured to allocate radio resources to the second geographic region based on the estimation of the second radio resource requirements.

The arrangement 700 (e.g. the determiner, the estimator and the allocator) may, for example, be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor".

The communication terminals may each for example be at least partially be implemented by a transceiver may for example be at least partially implemented by a modem (e.g. an LTE modem), a baseband processor or other transceiver components or also by an application processor. The communication terminals may include typical communication terminal devices, such as a transceiver (including e.g. a baseband processor, one or more filters, transmit chains, receive chains, amplifiers etc.), an antenna, a subscriber identity module, an application processor etc.

The following examples pertain to further exemplary implementations.

Example 1 is a method for allocating radio resources to a geographical region as illustrated in FIG. 6.

In Example 2, the subject-matter of Example 1 may optionally include the communication terminals corresponding to vehicles.

In Example 3, the subject-matter of any one of Examples 1-2 may optionally include the communication terminals being vehicle user equipments.

In Example 4, the subject-matter of any one of Examples 1-3 may optionally include the first radio resource requirements and the second radio resource requirements being requirements for radio resources for direct UE-to-UE communication.

In Example 5, the subject-matter of any one of Examples 1-4 may optionally include the first radio resource requirements and the second radio resource requirements being requirements for radio resources for vehicle communication.

In Example 6, the subject-matter of any one of Examples 1-5 may optionally include the first radio resource requirements and the second radio resource requirements being requirements for radio resources shared between multiple base stations.

In Example 7, the subject-matter of any one of Examples 1-6 may optionally include the first radio resource requirements and the second radio resource requirements being requirements for radio resources shared between multiple cellular communication networks.

In Example 8, the subject-matter of any one of Examples 1-7 may optionally include the first radio resource requirements and the second radio resource requirements being requirements for radio resources shared between multiple cellular communication networks of different operators.

In Example 9, the subject-matter of any one of Examples 1-8 may optionally include, for each of multiple cellular communication networks, second radio resource requirements which exist in the second geographic region in the second time period being estimated based on movement information about communication terminals causing first radio requirements in the first geographic region and may optionally include allocating radio resources to the cellular communication networks based on the estimations of the second radio resource requirements.

In Example 10, the subject-matter of any one of Examples 1-9 may optionally include the first time period being a current time period and the second time period being a future time period.

In Example 11, the subject-matter of any one of Examples 1-10 may optionally include the first radio resource requirements and the second radio resource requirements being requirements for radio resources for Vehicle-to-Everything communication.

In Example 12, the subject-matter of any one of Examples 1-11 may optionally include the movement information including road network information.

In Example 13, the subject-matter of any one of Examples 1-12 may optionally include the movement information including traveling speed information of the communication terminals.

In Example 14, the subject-matter of any one of Examples 1-13 may optionally include the movement information including traveling direction information of the communication terminals.

In Example 15, the subject-matter of any one of Examples 1-14 may optionally include the movement information including traffic flow information.

In Example 16, the subject-matter of any one of Examples 1-15 may optionally include estimating the second radio resource requirements being further based on an expected size and an expected transmission frequency of occurrence of messages transmitted by the communication terminals.

In Example 17, the subject-matter of any one of Examples 1-16 may optionally include the messages being Vehicle-to-Everything messages.

Example 18 is an arrangement for allocating radio resources to a geographical region as illustrated in FIG. 7.

In Example 19, the subject-matter of Example 18 may optionally include the communication terminals corresponding to vehicles.

In Example 20, the subject-matter of any one of Examples 18-19 may optionally include the communication terminals being vehicle user equipments.

In Example 21, the subject-matter of any one of Examples 18-20 may optionally include the first radio resource requirements and the second radio resource requirements being requirements for radio resources for direct UE-to-UE communication.

In Example 22, the subject-matter of any one of Examples 18-21 may optionally include the first radio resource requirements and the second radio resource requirements being requirements for radio resources for vehicle communication.

In Example 23, the subject-matter of any one of Examples 18-22 may optionally include the first radio resource requirements and the second radio resource requirements being requirements for radio resources shared between multiple base stations.

In Example 24, the subject-matter of any one of Examples 18-23 may optionally include the first radio resource requirements and the second radio resource requirements being requirements for radio resources shared between multiple cellular communication networks.

In Example 25, the subject-matter of any one of Examples 18-24 may optionally include the first radio resource requirements and the second radio resource requirements being requirements for radio resources shared between multiple cellular communication networks of different operators.

In Example 26, the subject-matter of any one of Examples 18-25 may optionally include, for each of multiple cellular communication networks, second radio resource requirements which exist in the second geographic region in the second time period being estimated based on movement information about communication terminals causing first radio requirements in the first geographic region and the allocator being configured to allocate radio resources to the cellular communication networks based on the estimations of the second radio resource requirements.

In Example 27, the subject-matter of any one of Examples 18-26 may optionally include the first time period being a current time period and the second time period being a future time period.

In Example 28, the subject-matter of any one of Examples 18-27 may optionally include the first radio resource requirements and the second radio resource requirements being requirements for radio resources for Vehicle-to-Everything communication.

In Example 29, the subject-matter of any one of Examples 18-28 may optionally include the movement information including road network information.

In Example 30, the subject-matter of any one of Examples 18-29 may optionally include the movement information including traveling speed information of the communication terminals.

In Example 31, the subject-matter of any one of Examples 18-30 may optionally include the movement information including traveling direction information of the communication terminals.

In Example 32, the subject-matter of any one of Examples 18-31 may optionally include the movement information including traffic flow information.

In Example 33, the subject-matter of any one of Examples 18-32 may optionally include the estimator being further configured to estimate the second radio resource requirements further based on an expected size and an expected transmission frequency of occurrence of messages transmitted by the communication terminals.

In Example 34, the subject-matter of any one of Examples 18-33 may optionally include the messages being Vehicle-to-Everything messages.

According to other examples, a method (and a corresponding arrangement) for allocating radio resources to one or more communication terminals are provided wherein the method includes: determining a set of communication terminals expected to enter a coverage area of a cellular mobile communication network based on movement information of the communication terminals, determining current radio resource requirements of the set of communication terminals, determining future radio resource requirements in the coverage area based on the determined current radio resource requirements and allocating radio resources to the coverage area based on the determined future radio resource requirements.

According to a further example, a first entity in a network catering for vehicular (V2X) services and a second entity dividing a given geographical area in different zones based on road configurations may be provided, the second entity using one or more of the following parameters to predict the resource requirement for a given zone in the next time segment:—the resource usage information in the given zone in the current time segment;—the resource usage information in the zones adjacent to the given zone in the current time segment;—road configuration in the given zone and its adjacent zones;—traffic information in the given zone and its adjacent zones; and—speed and direction of travel of the vehicles in the given zone and its adjacent zones.

The first entity may be an eNB or resource arbitrator or MEC (mobile edge computing) device. The second entity may also be eNB or resource arbitrator or a MEC device.

The road configuration may, for example, be known to the second entity via a detailed map.

The speed and direction of travel of each vehicle may, for example, be determined via a message transmitted from the vehicle UE to the eNB containing this information.

Resource usage information is, for example, the resource requirement in the current time segment.

Resource usage information may be a function of the size of the V2X message and the typical number of V2X retransmissions (usually 10 times per second is the transmission rate).

The a V2X message is, for example, a Basic Safety Message (BSM)

Traffic information may, for example, be received from an ITS (intelligent transportation system) server via an interface between the respective node (e.g. corresponding to the second entity) and the ITS server.

It should be noted that one or more of the features of any of the examples above may be combined with any one of the other examples.

While specific aspects have been described, it should be understood by those skilled in the art that various changes in form and detail may be made therein without departing from the spirit and scope of the aspects of the present disclosure. All changes which come within the meaning and range of equivalency of the claims are therefore intended to be embraced.

The invention claimed is:

1. A method for allocating radio resources, the method comprising:

determining first radio resource utilization information for a first duration of a first geographic region;

estimating second radio resource utilization information for a second duration of a second geographic region, based on the first radio utilization information and based on movement information about one or more communication terminals that affected the first radio utilization information in the first geographic region; and allocating radio resources for the second geographic region based on the estimation of the second radio resource utilization information, wherein the first duration precedes the second duration, and wherein the first geographic region is neighboring to the second geographic region.

2. The method of claim 1, wherein the one or more communication terminals respectively correspond to one or more vehicles.

3. The method of claim 1, wherein each communication terminal of the one or more communication terminals is a vehicle user equipment (UE).

4. The method of claim 1, wherein the first radio resource utilization information and the second radio resource utilization information comprise information about radio resources for direct UE-to-UE communication.

5. The method of claim 1, wherein the first radio resource utilization information and the second radio resource utilization information comprise information about radio resources shared between a plurality of base stations.

6. The method of claim 1, wherein the first radio resource utilization information and the second radio resource utilization information comprise information about radio resources shared between a plurality of cellular communication networks.

7. The method of claim 1, wherein the first radio resource utilization information and the second radio resource utilization information comprise information about radio resources shared between a plurality of cellular communication networks of different operators.

8. The method of claim 1, wherein estimating the second radio resource utilization information for the second duration of the second geographic region comprises:

estimating, for each communication network of a plurality of cellular communication networks, respective second radio resource utilization information for the second duration of the second geographic region, based on the movement information about the one or more communication terminals that affected the first radio utilization information in the first geographic region; and wherein allocating the radio resources for the second geographic region comprises:

allocating the radio resources, for the second geographic region, to the plurality of cellular communication networks based on the plurality of estimations of the respective second radio resource utilization information.

9. The method of claim 1, wherein the first duration is a current duration, and wherein the second duration is a future duration.

10. The method of claim 1, wherein the first radio resource utilization information and the second radio resource utilization information comprise information about radio resources for Vehicle-to-Everything communication.

11. The method of claim 1, wherein the movement information comprises:

road network information, travelling speed information of the communication terminals, travelling direction information of the communication terminals, and/or traffic flow information.

12. The method of claim 1, wherein estimating the second radio resource utilization information for the second duration of the second geographic region comprises:

estimating the second radio resource utilization information for the second duration of the second geographic region further based on an expected size and an expected transmission frequency of messages transmitted by the one or more communication terminals.

13. The method of claim 12, wherein the messages are Vehicle-to-Everything messages.

14. An arrangement for allocating radio resources, the arrangement comprising:

a determiner configured to determine first radio resource utilization information for a first duration of a first geographic region;

an estimator configured to estimate second radio resource utilization information for a second duration of a second geographic region, based on the first radio resource utilization information and based on movement information about a plurality of communication terminals that affected the first radio resource utilization information in the first geographic region; and an allocator configured to allocate radio resources for the second geographic region based on the estimation of the second radio resource utilization information, wherein the first duration precedes the second duration, and wherein the first geographic region is neighboring to the second geographic region.

15. The arrangement of claim 14, wherein each communication terminal of the plurality of communication terminals is a vehicle user equipment (UE).

16. The arrangement of claim 14, wherein the first radio resource utilization information and the second radio resource utilization information comprise information about radio resources for direct UE-to-UE communication.

17. The arrangement of claim 14, wherein the first radio resource utilization information and the second radio resource utilization information comprise information about radio resources for vehicle communication.

18. The arrangement of claim 14, wherein the first radio resource utilization information and the second radio resource utilization information comprise information about radio resources shared between a plurality of base stations.

19. The arrangement of claim 14, wherein the first radio resource utilization information and the second radio resource utilization information comprise information about radio resources shared between a plurality of cellular communication networks of different operators.

20. One or more non-transitory computer-readable media storing instructions thereon, which when executed by at least one processor of a radio resource allocating arrangement, direct the radio resource allocating arrangement to:

determine first radio resource utilization information for a first duration of a first geographic region;

estimate second radio resource utilization information for a second duration of a second geographic region, based on the first radio resource utilization information and based on movement information about a communication terminal that affected the first radio resource utilization information in the first geographic region; and allocate radio resources for the second geographic region based on the estimation of the second radio resource utilization information, wherein the first duration precedes the second duration, and wherein the first geographic region is neighboring to the second geographic region.

* * * * *